May 8, 1934.   W. W. PATTERSON   1,957,665
ADVERTISING DEVICE
Filed Jan. 16, 1933   2 Sheets-Sheet 1
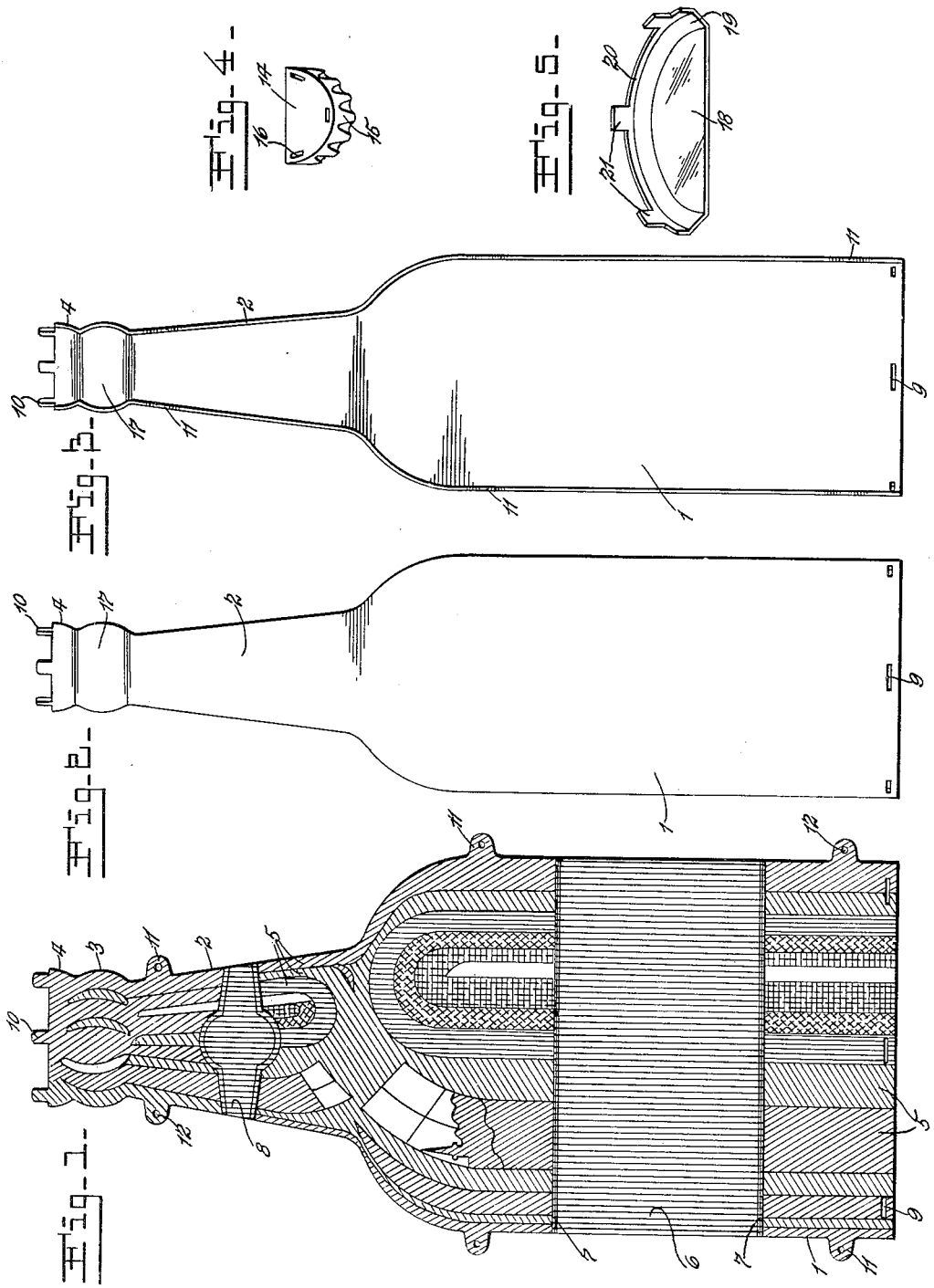

May 8, 1934.　　　　W. W. PATTERSON　　　　1,957,665
ADVERTISING DEVICE
Filed Jan. 16, 1933　　　　2 Sheets-Sheet 2
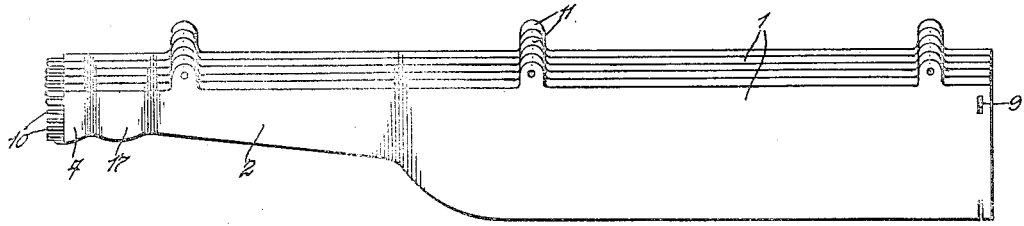
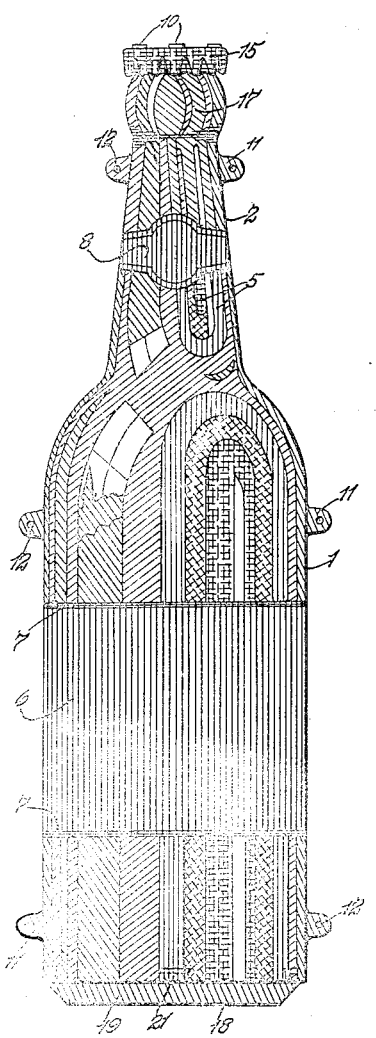
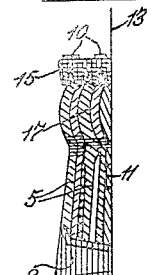
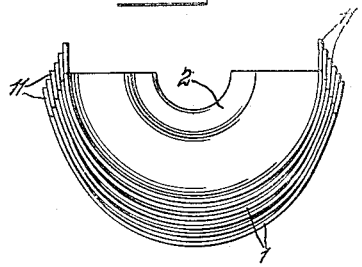
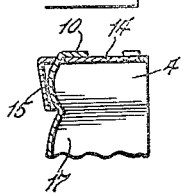
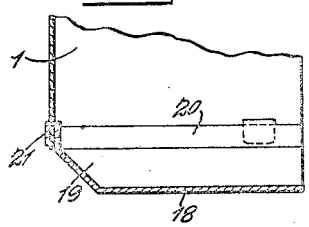
Inventor
Ward W. Patterson
by Rypsey & Kingsland
His Attorneys Patented May 8, 1934

1,957,665

UNITED STATES PATENT OFFICE 1,957,665

ADVERTISING DEVICE

Ward W. Patterson, Webster Groves, Mo.

Application January 16, 1933, Serial No. 651,944

1 Claim. (Cl. 40—126)

This invention relates to advertising devices.

An object of the invention is to provide an attractive and effective advertising device designed and adapted to be applied and used in substitution for the usual and familiar painted or printed displays on billboards, walls and other surfaces to which the painted displays are usually affixed, comprising a visual representation of the merchandise or of the container for the merchandise to be advertised.

Another object of the invention is to provide an advertising device for use in substitution for the usual and familiar painted displays on billboards, walls and other surfaces to which said displays are usually affixed, comprising a representation of a visible portion of a liquid container, made of non-transparent and non-translucent material, having the shape and configuration of the container which it is intended to represent and having a surface provided with areas of contrasting colors and tints having the appearance of the actual container filled with liquid and refracting and reflecting light, so that the device is an approximately correct or idealized representation of a container filled with liquid of the type advertised by the device.

Another object of the invention is to provide an advertising device comprising a member having the form and shape of an article of merchandise to be advertised and having its surface contrastingly colored and tinted in accordance with the contrasting colors and tints of the article advertised, so as to simulate and resemble the article in shape, form and appearance, and means for attaching the device to a billboard or other surface in substitution for the usual flat painted display, in a manner in which the device protrudes and extends from the billboard or surface to which it is attached and thereby truly resembles by three dimensions the three dimensions of the articles to be advertised by the respective devices.

Another object of the invention is to provide an improved advertising device of the type and character and for the purposes mentioned constructed and arranged so that the devices may be easily nested for packing and shipping purposes, thus enabling the manufacturer of these devices to transport them within permissible limits of cost and expense to places remote from the place of manufacture.

Various other objects and advantages will be apparent from the following description, reference being made to the annexed drawings, in which—

Fig. 1 is a plan view of a blank having colored and tinted areas on the exposed surface thereof and which blank is designed and adapted to be shaped and formed to represent the visible one-half portion of a bottle.

Fig. 2 is an outer side view showing the visibile one-half portion of a bottle obtained by shaping and forming the blank shown in Fig. 1, the colored and tinted areas being omitted.

Fig. 3 is an inner side view of the device shown in Fig. 2.

Fig. 4 is a perspective view of a cap or covering member adapted to be attached to the device shown in Figs. 2 and 3.

Fig. 5 is a perspective view of a bottom or lower end member adapted to be attached to the device shown in Figs. 2 and 3.

Fig. 6 is a side elevation showing a number of the devices nested for packing or transportation.

Fig. 7 is an outer side elevation of the completed advertising device having the top and bottom members attached thereto.

Fig. 8 is a side elevation of the advertising device shown in Fig. 7.

Fig. 9 is an end elevation of the series of nested advertising devices shown in Fig. 6.

Fig. 10 is a sectional view showing the construction by which the cap or covering member is attached and retained in the position in which it is shown in Figs. 7 and 8.

Fig. 11 is a sectional view showing the manner in which the bottom or lower end member shown in Fig. 5 is attached and retained in connection with the device as shown in Figs. 7 and 8.

The opaque blank shown in Fig. 1 is made of a flat sheet of metal, or other material suitable for this purpose, and comprises a lower body portion 1 formed in integral connection with an upwardly extended elongation 2 having near its upper end outwardly curved extended portions 3 above which are outwardly extended portions 4.

The outer surface of this blank has numerous areas 5 colored and tinted to resemble the colors and tints of corresponding areas of a glass bottle containing liquid of the kind which it is intended to advertise and located in a lighted place. It is known that bottles containing beverages and exposed to light will reflect and refract light rays and produce numerous areas of contrasting colors and tints. When the observer looks at the bottle containing the beverage and exposed to light, the contrastingly colored and tinted areas are plainly visible. This is nearly always true unless the beverage is colorless, and even colorless beverages in bottles exposed to light often reflect and refract the light and produce certain contrastingly colored and tinted areas.

Additionally, the area 6 of the outer surface of the body 1 between the transverse lines 7 is colored and tinted to represent a label affixed to a bottle and having suitable or appropriate emblems, symbols, notations or names thereon, indicating the origin of the merchandise advertised. A label affixed to the outer surface of a bottle containing the beverage, or other liquid, prevents the reflection and refraction of light by the liquid, so that the contrastingly colored and tinted areas 5 do not extend across the space between the lines 7, but end and terminate at said lines.

The transverse area 8 across the outer surface of the reduced neck portion 2 of the blank is colored and tinted in contrast with the colored and tinted areas 5 in simulation of a neck band often found attached to a liquid or beverage bottle. The contrastingly colored and tinted areas 5 terminate at the upper and lower edges of the area 8. This area 8 may contain any emblem, symbol, name or trade-mark indicating the origin of the merchandise advertised.

These contrastingly colored and tinted areas 5, 6 and 8 may be applied or affixed to the outer surface of the blank in numerous ways and by means of several different materials or substances, such as paint or enamel or the preparation commercially known as duco, or other preparation suitable for this purpose.

The lower end of the blank may be provided with a number of slots 9 and the upper end of the blank with a number of projecting ears 10 and the side edges of the blank with lateral extensions 11.

This blank, after being provided with contrastingly colored and tinted areas, may then be bent and given a permanent shape substantially semi-circular in cross section, or of other cross sectional shape, to correspond to the shape of a bottle or other container to be represented by the device. In the specific embodiment of the invention shown, the blank is shaped to represent one-half of a bottle seen in side elevation, as clearly shown in Figs. 2 and 7, and at an angle of ninety degrees therefrom shown in Fig. 8, the contrastingly colored and tinted areas being omitted from Figs. 2 and 6 for convenience.

The longitudinal side edges of the device are preferably in straight lines, as shown in Figs. 6 and 8, in order to seat against the plain surface of a billboard, wall, or other support to which the device may be attached.

Until it is desired to secure the device to a billboard, wall, or other support, the ears 11 are not bent laterally but remain extended in continuation of the marginal portions of the device, as will be understood by reference to Figs. 3, 6 and 9. When it is desired to attach the device to a billboard, wall, or other support, the ears 11 may be bent laterally, as shown in Figs. 7 and 8, or these ears may be otherwise attached to the supporting member. The ears 11 are provided with holes 12 through which fasteners may be extended and engaged in the billboard, wall, or other support, to support the device in connection therewith in a relationship resembling one-half of a bottle containing liquid extending beyond the surface 13 of the billboard, wall, or other support.

As shown in Fig. 4, I provide a cap or covering member including a top portion 14 and a depending crimped portion 15 resembling a metallic bottle cap. The top portion 14 has holes 16 through which the ears 10 are adapted to extend. This cap or covering member is applied to the device in such a way that the ears 10 extend upwardly through the holes 16 while the top portion 14 is seated on the upper end of the outwrdly extended portion 4, which is surrounded and engaged by the depending part 15 of the cap or covering member. The outwardly extended portion 3 of the blank is shaped to resemble an enlarged bead 17 having the contrastingly colored and tinted areas 5 on the outer surface thereof. After this cap or covering member is applied in this way, the ears 10 are bent downwardly into clamping engagement with the top portion 14, as clearly shown in Figs. 7 and 8, and thereby securely hold the cap or covering member attached to and forming a part of the completed device.

The bottom or lower end member, shown in Fig. 5, comprises a bottom portion 18 having an upwardly flaring marginal portion 19, the edge of which is extended vertically to provide a semi-circular vertical flange 20 having ears 21 extending from the edge thereof. This bottom or lower end member is applied by extending the flange 20 into the lower end of the body of the device and extending the ears 21 outwardly through the slots 9 and bending said ears downwardly to obtain a strong and durable attachment of the bottom or lower end member with the device.

Both the cap and the bottom members are appropriately colored and tinted in conformity with the usual coloring and tinting of the caps and bottoms of the bottles represented by the device.

An additional convenience of this construction is the facility with which the articles may be packed and shipped. As shown in Figs. 6 and 9, the devices are hollow and they may be assembled in nested relationship, so that a considerable number thereof will occupy only a little more space than a single one of the devices. This advantage is obtained in part as a result of the hollow construction of the devices, and in part because of the flexible quality of the material from which the devices are preferably made. However, in mentioning these qualities and features by which the devices may be conveniently nested for packing and shipping purposes, I do not restrict myself in these particulars, because the articles may be made of solid or inflexible material at the sacrifice of these advantages.

Instead of making the device in simulation of a bottle, it is clear that I may make the device in other forms to resemble other articles of merchandise or other containers. Accordingly, in describing this illustrative type of the invention, I do not restrict myself in any unessential or unrequired particulars.

I claim:

As an article of manufacture, a device for advertising a commodity contained in glass bottles which comprises a relatively thin section of opaque resilient material formed into the shape of a portion of a glass bottle and having on the entire exposed outer surface thereof areas of contrasting colors and tints in simulation of and resembling the colors and tints produced by light reflected and refracted by the glass bottle and its contents, a defined area on the surface of said section representing and simulating a standard label attached to the glass bottle of the advertised commodity, parts representing the visual three dimensions of a bottle cap and a bottle bottom respectively, means attaching said parts to the ends of said section thereby holding said ends from bending, and means for attaching said device to a support.

WARD W. PATTERSON.